United States Patent [19]

Wasilewski et al.

[11] Patent Number: 5,359,601
[45] Date of Patent: Oct. 25, 1994

[54] APPARATUS PROVIDING DYNAMIC VIRTUAL SERVICE SELECTION IN A MULTI-SERVICE COMMUNICATIONS SYSTEM

[75] Inventors: Anthony J. Wasilewski, Alpharetta; William B. Thatcher, Atlanta, both of Ga.

[73] Assignee: Scientific-Atlanta, Inc., Atlanta, Ga.

[21] Appl. No.: 27,782

[22] Filed: Mar. 8, 1993

Related U.S. Application Data

[63] Continuation-in-part of Ser. No. 968,846, Oct. 30, 1992.

[51] Int. Cl.$^5$ ............................................. H04H 1/06
[52] U.S. Cl. .................................. 370/73; 380/19;
348/906; 455/3.1
[58] Field of Search ............... 370/110.1, 71, 73, 76, 370/69.1; 380/34, 20, 10, 21, 13, 9, 19, 33; 358/146, 147, 145, 143, 142, 141; 455/3.1, 3.2, 4.2, 6.1, 6.2, 6.3; 379/399, 96, 97, 98, 101; 348/10, 11, 462, 465, 481, 906.6

[56] References Cited

U.S. PATENT DOCUMENTS

| | | | |
|---|---|---|---|
| 4,484,217 | 11/1984 | Block et al. | 358/84 |
| 4,908,859 | 3/1990 | Bennett | 380/10 |
| 5,003,384 | 3/1991 | Durden et al. | 358/84 |
| 5,200,823 | 4/1993 | Yoneda | 358/146 |

OTHER PUBLICATIONS

David P. Beddow, "The Virtual Channels Subscriber Interface", Communications Technology, pp. 30 & 49. (30 Apr. 1992).
Wasilewski, Anthony J., "Requirements and Method for High-Level Multiplexing of MPEG and Other Digital Service Bit-Streams with Universal Transport Layer", International Organization for Standardization, ISO/IEC JTC1/SC2/WG11 MPEG 92/754 (Nov. 2, 1992).
Four (4) viewgraphs, presented in confidence Mar. 9-10, 1992.

Primary Examiner—Benedict V. Safourek
Assistant Examiner—Dang Ton
Attorney, Agent, or Firm—Woodcock Washburn Kurtz Mackiewicz & Norris

[57] ABSTRACT

An apparatus providing a dynamic virtual service capability in a multi-service communications system is claimed. A dynamic virtual service comprises an associated group of basic services wherein only one of the basic services in the group is active at any time. Basic services comprise a number of service components which are transmitted to the apparatus on one or more of a plurality of different frequency channels. The apparatus comprises a service selection switch for selecting either one of the basic services directly or one of the dynamic virtual services. A dynamic virtual service map is provided that defines for each dynamic virtual service, on a time-varying basis, the currently active one of the group of basic services that comprise that dynamic virtual service. Means responsive to the service selection switch and to the dynamic virtual service map are provided for automatically selecting the currently active basic service of a subscriber selected dynamic virtual service. Finally, the apparatus provides means for receiving and accessing the service components of a selected basic service from the frequency channel carrying those components. According to one embodiment, dynamic virtual service map definitions are periodically re-transmitted to the apparatus on each frequency channel carrying service components of one of the group of basic services that comprise that dynamic virtual channel. Additionally, a "home" basic service may be defined for each virtual dynamic service. When a dynamic virtual service is initially selected by a subscriber, the apparatus initially "tunes" to the frequency channel carrying the service components of that home basic service.

38 Claims, 8 Drawing Sheets

| SERVICE NUMBER | FREQUENCY |
|---|---|
| 1 | $f_1$ |
| 2 | $f_1$ |
| 3 | $f_3$ |
| 4 | $f_2$ |
| ⋮ | ⋮ |
| 24 | $f_2$ |
| ⋮ | ⋮ |
| 30 | $f_3$ |
| 31 | $f_8$ |
| 32 | $f_8$ |
| ⋮ | ⋮ |
| 50 | $f_2$ (HBS = 24) |
| 51 | $f_3$ (HBS = 30) |
| 52 | $f_8$ (HBS = 31) |

BASIC SERVICE NOS. { rows 1–32 } — 92

DYNAMIC VIRTUAL SERVICE NOS. { rows 50–52 }

FREQUENCY CHANNEL OF HOME BASIC SERVICE

APPARATUS PROVIDING DYNAMIC VIRTUAL SERVICE SELECTION IN A MULTI-SERVICE COMMUNICATIONS SYSTEM

This is a continuation-in-part of U.S. patent application Ser. No. 07/968,846, filed Oct. 30, 1992, entitled "System and Method for Transmitting a Plurality of Digital Services".

BACKGROUND OF THE INVENTION

1. Field of the Invention

The present invention generally relates to multi-service communications systems wherein a plurality of different services are transmitted to subscriber locations over one or more different frequency channels. More particularly, the present invention relates to an apparatus for providing dynamic virtual service selection in such multi-service communications systems. A dynamic virtual service comprises a group of related services wherein different ones of the group are active on a time-varying basis.

2. Description of the Prior Art

Communications systems today have the ability to simultaneously transmit a multitude of video, audio, teletext and data services to subscribers. For example, with the advent of digital compression technologies, the subscription television industry has experienced an explosion in the number of services that can be provided to each subscriber.

Consequently, subscribers face an overwhelming choice of available services and providing efficient and inventive ways for subscribers to access these services is extremely important.

Most multi-service communications systems transmit different services over one or more different frequency channels. Each frequency channel may carry more than one service. Accessing a particular service requires tuning to the frequency channel carrying that service, and then selecting that service from the many services carried on that frequency channel. Generally, it is desirable to insulate subscribers from the details of service access and to allow subscribers to access different services in a like manner. Subscription television operators typically assign each service a unique number and then provide subscribers with a decoder that allows the subscriber to access a particular service by selecting that service's number using a push-button device or hand-held remote. Subscribers are thereby insulated from the complex details of service acquisition.

It is further desirable to provide system operators with the ability to easily re-assign service numbers to different services. Some services may be discontinued and others may be added, and therefore, a static numbering system rapidly becomes obsolete. Bennett et al., U.S. Pat. No. 4,908,859, describe an interface system for use at subscriber locations which provides system operators with some degree of flexibility. Bennett et. al. employ a mapping scheme that maps each of the services received on various frequency channels to a different subscriber selectable "interface channel." Essentially, Bennett et. al. provide a one-to-one mapping of each service to a particular subscriber selectable "interface channel." System operators can re-assign a service to a different interface channel as needed, such as when services are added or deleted from the system. Although the system of Bennett et. al. provides some degree of flexibility in defining access to various services, more flexible and creative means for providing subscriber access are needed as compression technologies make it possible to provide an ever increasing number of available services. The present invention satisfies this need.

SUMMARY OF THE INVENTION

The present invention is directed to an apparatus for enabling a subscriber to access different basic services in a multi-service communications system wherein each of the different basic services comprises a plurality of service components, and the service components of each basic service are received in a multiplexed form on one of a plurality of frequency channels. Some frequency channels may contain multiplexed service components for more than one basic service. According to the present invention, the apparatus provides a dynamic virtual service facility that enables system operators to define new services, referred to herein as "dynamic virtual services." A dynamic virtual service comprises an associated group of basic services wherein only one of the basic services in the group is active at any time.

According to a preferred embodiment, the apparatus comprises a service selection switch for selecting either one of the basic services directly or one of the dynamic virtual services. A dynamic virtual service map is provided that defines for each dynamic virtual service, on a time-varying basis, the currently active one of the group of basic services that comprise (i.e., "make-up") that dynamic virtual service. Means responsive to the service selection switch and to the dynamic virtual service map are provided for automatically selecting the currently active basic service of a subscriber selected dynamic virtual service. Finally, the apparatus provides means for receiving and accessing the service components of a selected basic service from the frequency channel carrying those components.

The dynamic virtual service map contains a dynamic virtual service definition for each dynamic virtual service. Each dynamic virtual service definition comprises a dynamic virtual service number designation and an active basic service designation that specifies the currently active basic service for the designated dynamic virtual service. According to a preferred embodiment, the definition for each dynamic virtual service is periodically re-transmitted to the apparatus on each frequency channel carrying service components of one of the group of basic services that comprise that dynamic virtual channel. Accordingly, the apparatus further comprises means for receiving and processing the transmitted dynamic virtual service definitions.

According to one embodiment of the present invention, a home basic service is defined for each dynamic virtual service. The home basic service for a particular dynamic virtual service is selected from one of the group of basic services that comprise that dynamic virtual service. When a dynamic virtual service is initially selected by a subscriber, the apparatus initially "tunes" to the frequency channel carrying the service components of that home basic service. Of course, if the currently active basic service specified in the dynamic virtual service map definition for the selected dynamic virtual service is different than the home basic service, the apparatus will immediately re-tune to the frequency channel carrying the currently active basic service. Preferably, the home basic service for a particular dynamic virtual service is the basic service that, on average, is most often the currently active basic service for that dynamic virtual service.

According to one embodiment of the present invention, the means for receiving and accessing the service components of a selected basic service comprises a tuning map, a tunable receiver, a service-to-component map, and a service component de-multiplexer. The tuning map identifies, for each basic service, which of the frequency channels carries the multiplexed service components that comprise that basic service. For each dynamic virtual service, the tuning map specifies the frequency channel carrying the home basic service for that dynamic virtual service. The tunable receiver is responsive to the tuning map for tuning to the frequency channel carrying the multiplexed service components for a selected service and for receiving the multiplexed service components carried on that frequency channel. The service-to-component map then defines, for the selected basic service, which multiplexed service components in the received frequency channel comprise that basic service. The service component de-multiplexer, which is coupled to the receiver and responsive to the service-to-component map, then de-multiplexes the received multiplexed service components and obtains those service components that comprise the selected basic service. The tuning map may be reprogrammed by transmitting a modified tuning map on one or more of the frequency channels. Like the dynamic virtual service map definition for each dynamic virtual service, the service-to-component map definition for each basic service is periodically re-transmitted to the apparatus on the frequency channel carrying the service components of that basic service. Accordingly, the apparatus of the present invention further comprises means for receiving and processing the transmitted service-to-component map definitions. Each service-to-component map definition comprises a service number designation and at least one service component assignment.

Additional features and details of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Before proceeding to the description of the drawings, it should be understood that, although the present invention is described herein in the context of a subscription television system, the present invention is in no way limited thereto. Rather, the present invention may be employed in any system in which access to a plurality of transmitted services is required.

Figure 1:
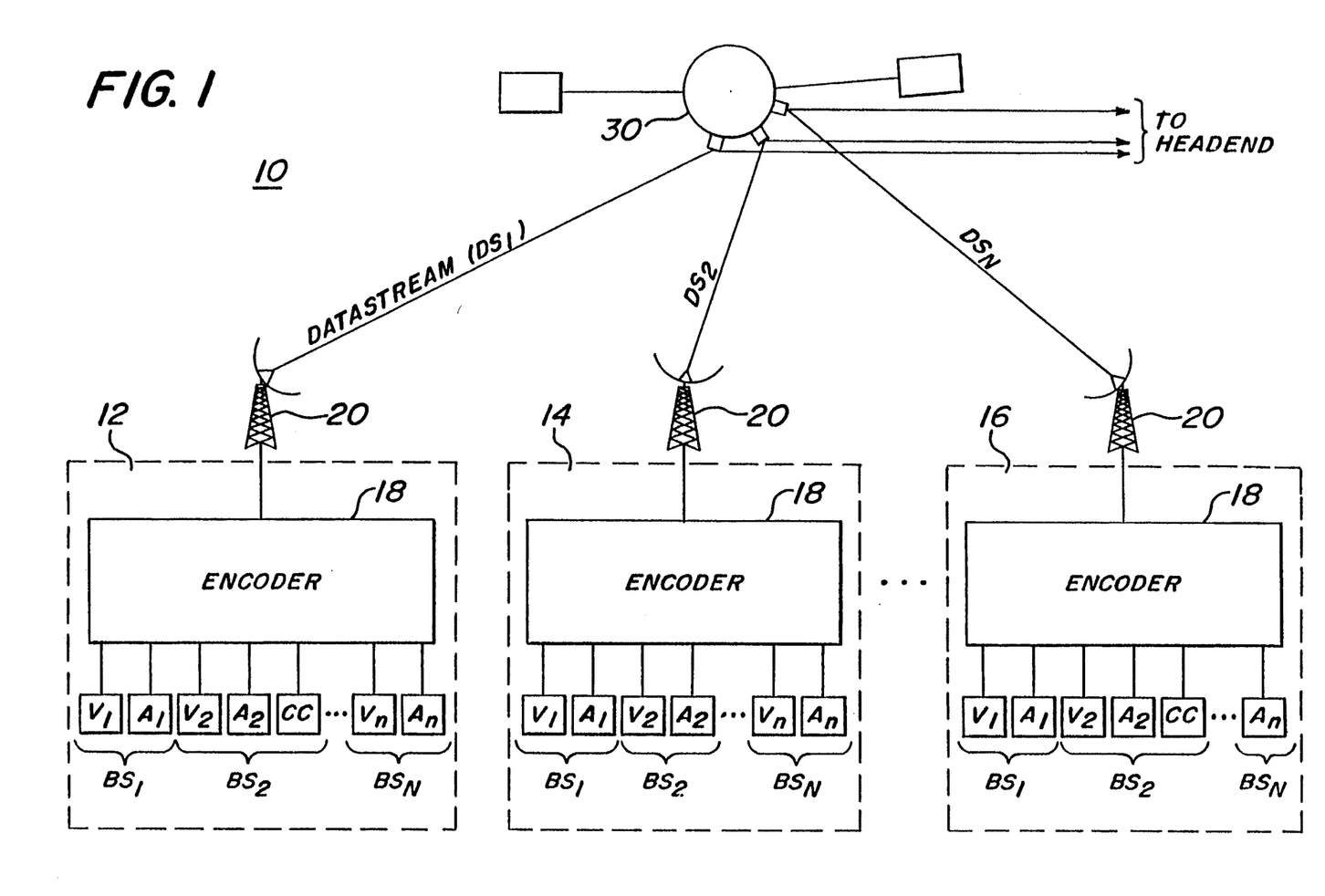
FIG. 1 is a block diagram of an exemplary subscription television system in which the apparatus of the present invention may be employed.

Referring now to the drawings wherein like numerals indicate like elements throughout, FIG. 1 shows a partial block diagram of an exemplary subscription television system 10 in which the apparatus of the present invention may be employed. As shown, the system 10 comprises a plurality of encoders 18 each of which is operated by a "programmer", e.g. 12, 14 and 16. Any number of programmers may be present in the system 10. Programmers are entities that provide a number of basic services (e.g., $BS_1..BS_N$) for transmission to various subscribers. For example, in FIG. 1, programmer 12 is providing basic services $BS_1$, $BS_2..BS_N$. The number of basic service provided by a given programmer is limited only by available bandwidth. In subscription television systems, basic services are most often television programs, however, any type of service can be transmitted. For example, a basic service can be a digital audio service or a teletext service.

Each basic service comprises a set of related service components, such as video (V), audio (A) and closed-captioning (CC) service components, as shown. In the present embodiment, the service components comprise digital data, however, the present invention is not limited thereto and may also be employed in systems that transmit analog service components or a combination of digital and analog service components. Moreover, one or more service components of a given basic service may be compressed and/or encrypted prior to transmission.

As shown, the service components (i.e., V, A, CC) are provided to the encoder 18 at each programmer site 12, 14, 16. Each encoder 18 multiplexes the service components and generates a data stream containing the multiplexed service components and, if desired, various other system related data. Each programmer 12, 14, 16 then provides its data stream to a respective satellite up-link 20 for transmission via satellite 30 to a remote location, such as a head-end installation or a direct-broadcast-satellite (DBS) subscriber. Typically, each programmer transmits its respective data stream over a different satellite transponder. Each transponder operates at a different transponder frequency. U.S. patent application Ser. No. 07/968,846, filed Oct. 30, 1992, and entitled "System and Method for Transmitting a Plurality of Digital Services," describes an exemplary encoder that may be employed in the system 10. It is understood, however, that the particular implementation of each encoder 18 is not crucial to the present invention.

Figure 2:
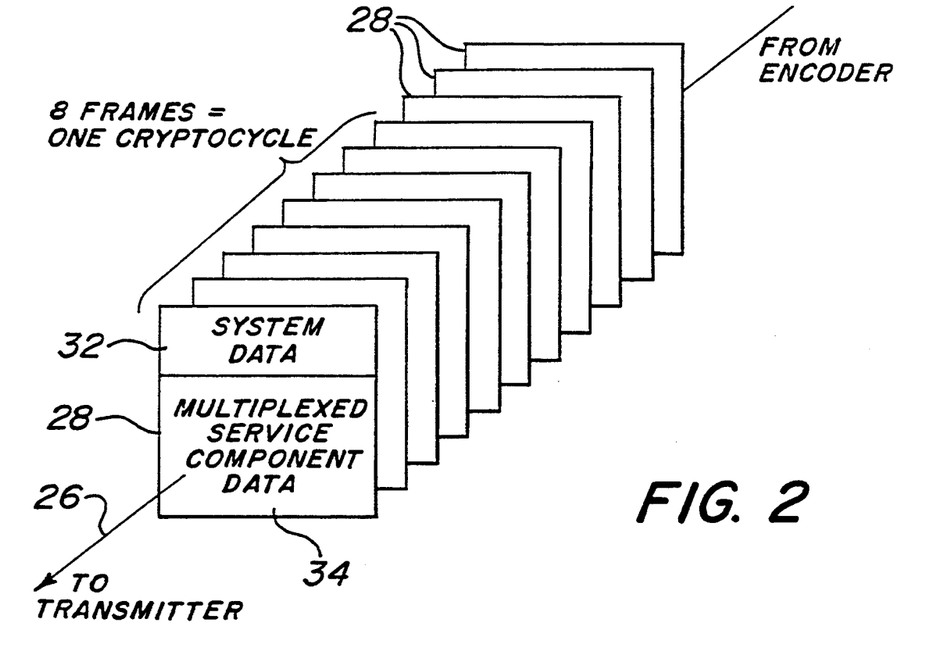
FIG. 2 graphically illustrates the content and arrangement of an exemplary digital data stream comprising system data and a plurality of multiplexed service components.

FIG. 2 is a graphical illustration of an exemplary data stream 26 generated by an encoder 18 of FIG. 1. As shown, the exemplary data stream 26 comprises a continuous sequence of frames 28. A system data region 32 of each frame may contain system related information necessary for operation of the system 10. A service component data region 34 of each frame carries the multiplexed service components of the various basic services input to the encoder 18. As described hereinafter in greater detail, the system data may include information employed by the apparatus of the present invention. Because certain types of system data may be too numerous to transmit in a single frame, these types of data may be spread over a series of frames referred to herein as a "cryptocycle." According to the example shown in FIG. 2, a cryptocycle comprises eight (8) frames; however, a cryptocycle can be defined by any number of frames. Essentially, cryptocycles define fixed boundaries in the data stream 26 within which a complete set of system data is transmitted.

Figure 3:
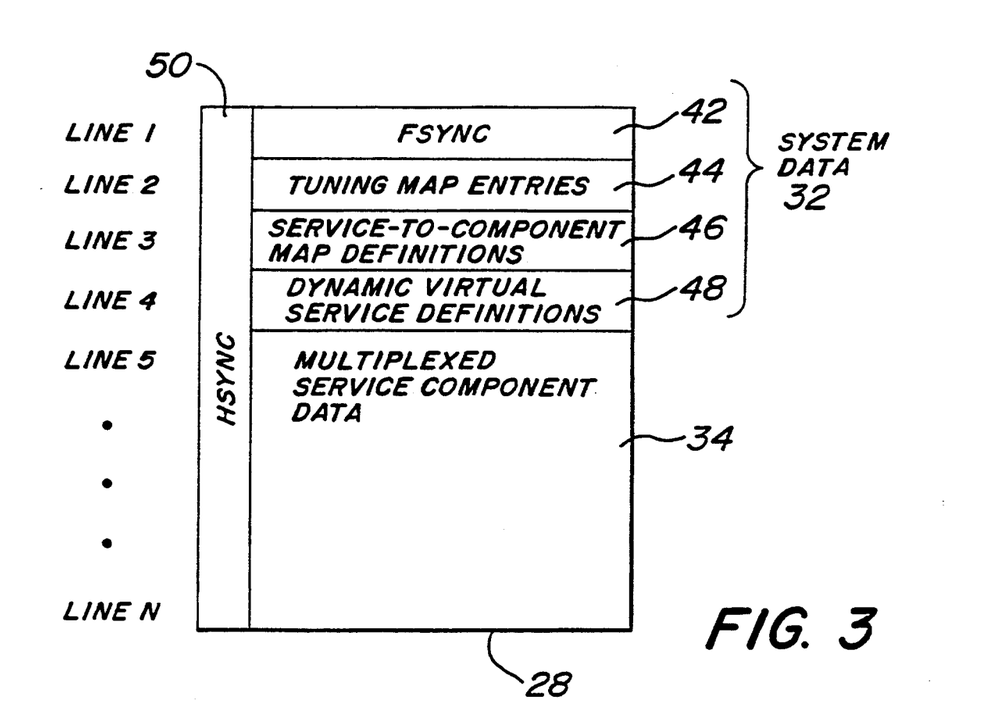
FIG. 3 illustrates further details of the content and arrangement of the exemplary data stream of FIG. 2.

FIG. 3 illustrates in greater detail the general arrangement and format of a single frame 28 of the exemplary data stream 26 of FIG. 2. As shown, each frame begins with a frame sync word (FSYNC) 42, and each line of the frame may begin with a horizontal sync word (HSYNC) 50. Each line may comprise a fixed number of bits, such as 1600 bits. Decoders in the system may employ the HSYNC and VSYNC words to establish frame synchronization after receiving the data stream. For purposes described hereinafter, the system data region 32 of each frame 28 may carry tuning map entries 44, service-to-component map definitions 46, and/or dynamic virtual service map definitions 48. Other system related information may also be carried. As explained above, the multiplexed service components are carried in region 34 of each frame 28. Preferably, the service components are multiplexed by allocating different portions of region 34 to each service component. An exemplary method of multiplexing the individual service components is described in aforementioned U.S. patent application Ser. No. 07/968,846. As with the implementation of each encoder 18, however, the exact arrangement and format of the data stream is not crucial to the present invention. Rather the present invention is applicable to any communications system wherein individual service components are multiplexed and transmitted to a remote location. For example, the present invention may be employed in a system that transmits multiplexed service components and system data in a packetized format. FIGS. 2 and 3 merely illustrate an exemplary data stream format.

Figure 4:
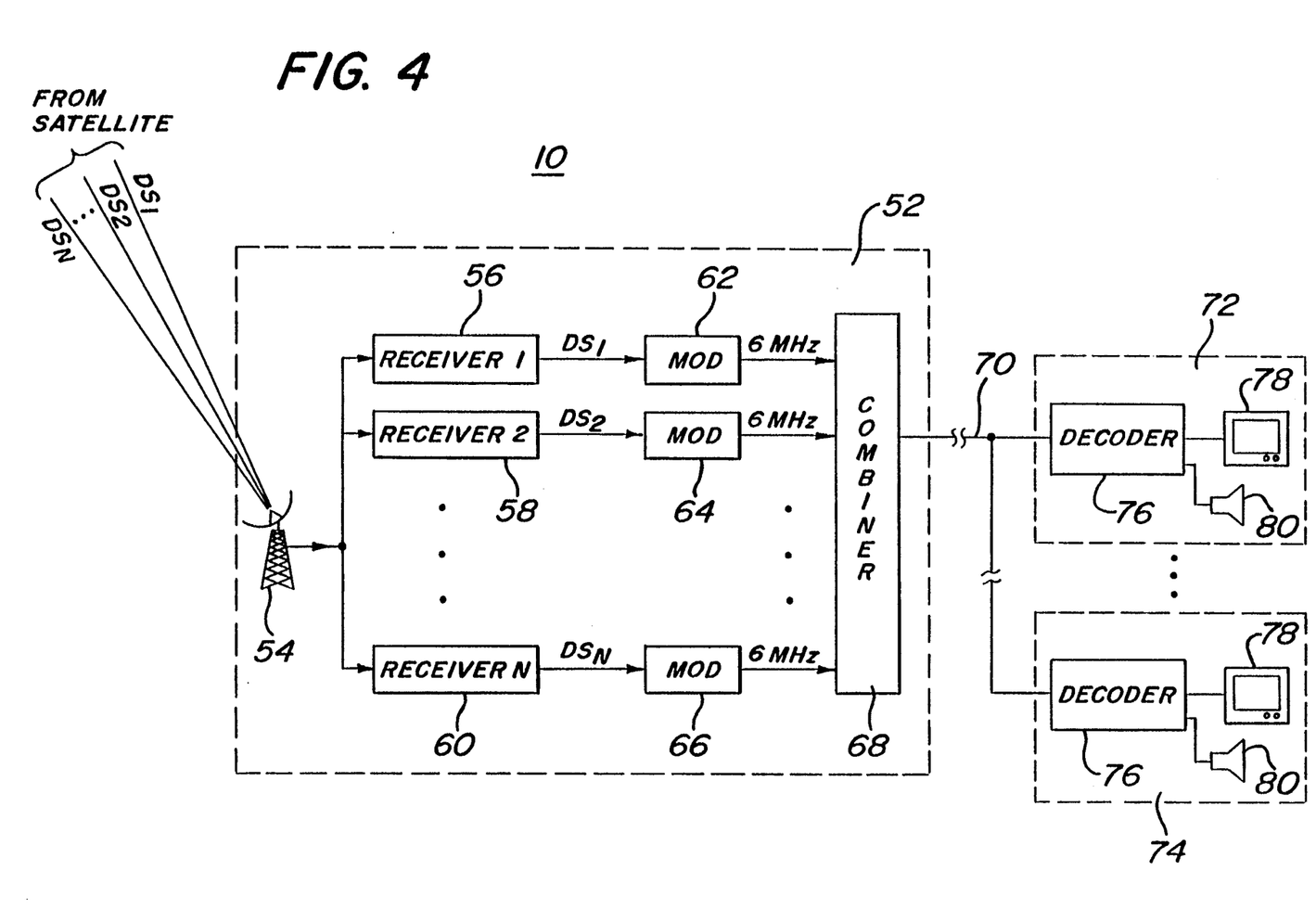
FIG. 4 is a block diagram providing further details of the exemplary subscription television system of FIG. 1.

FIG. 4 illustrates further details of the exemplary subscription television system 10 of FIG. 1. In particular, FIG. 4 shows a block diagram of a cable head-end installation 52 and a plurality of subscriber locations, e.g. 72, 74. As shown, the data streams (i.e., $DS_1$, $DS_2$...$DS_N$) transmitted by each programmer 12, 14, 16 are acquired at the head-end 52 via satellite down-link 54 and provided to respective receivers 56, 58, 60. Each receiver 56, 58, 60 is tuned to a respective satellite transponder frequency for receiving the data stream carried over that transponder. After receipt at the head-end 52, each data stream is then provided to a respective modulator 62, 64 or 66 where it is modulated on a unique frequency channel. Each frequency channel typically has a bandwidth of 6 MHz, however, the bandwidth of each frequency channel may vary with different applications. Modulators 62, 64 and 66 preferably employ 4-VSB (vestigial side-band) modulation, however, any suitable modulation technique may be employed. As shown, the individual frequency channels are then provided to a combiner 68 that combines the frequency channels into a single wide-band signal that is then transmitted via a cable distribution network 70 to each of the subscriber locations 72, 74. As can be appreciated, therefore, the service components of each basic service are received at a subscriber location in multiplexed form on one of the plurality of frequency channels. Moreover, each frequency channel may carry the multiplexed service components for more than one service. A decoder 76 is provided at each subscriber location 72, 74 to enable the subscriber at that location to access different ones of the basic services. In a subscription television system, the basic services are most often television programs or audio programs that are output on a television set 78 and/or audio output device 80 at the subscriber location.

Figure 5:
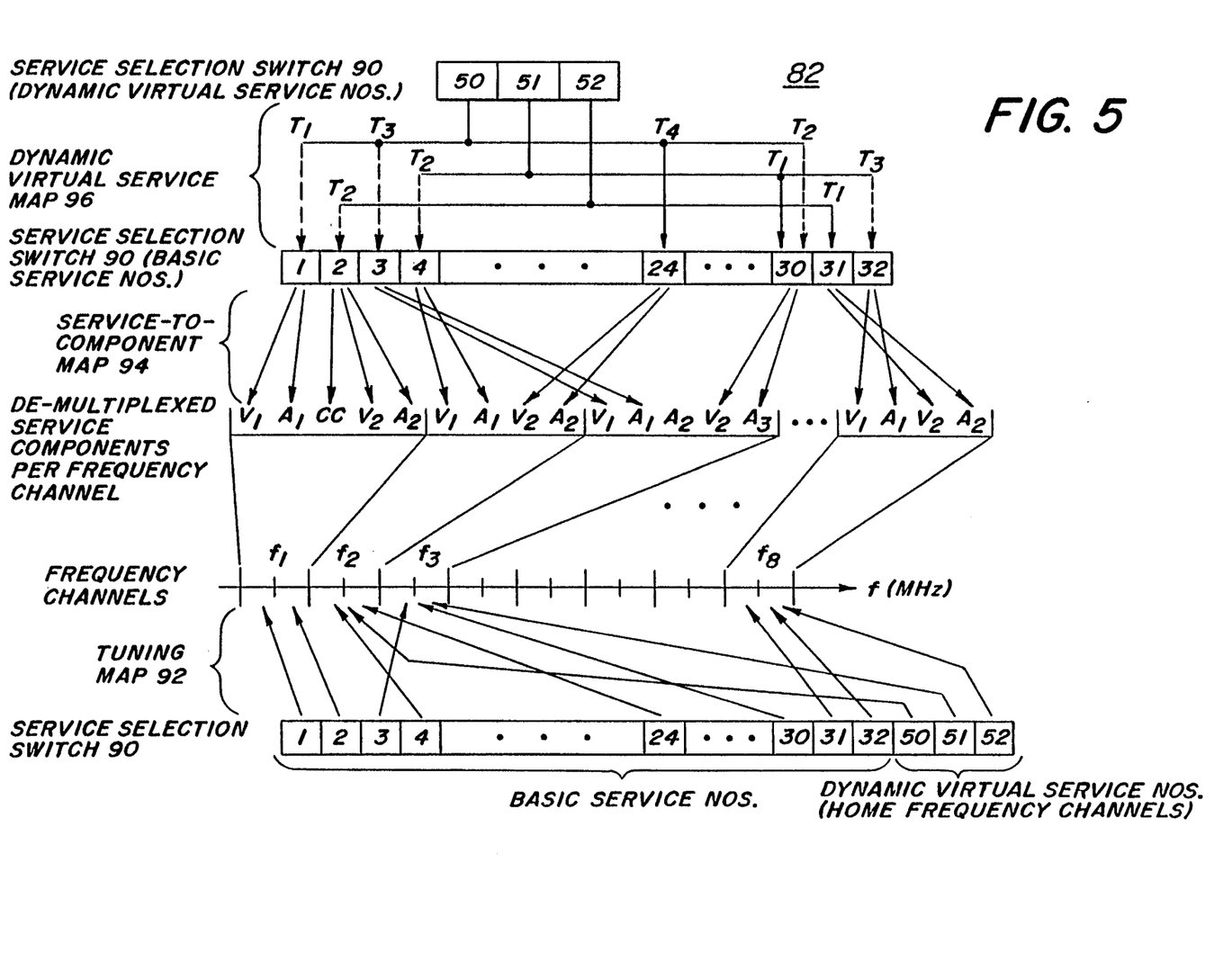
FIG. 5 is a functional diagram of an apparatus for providing dynamic virtual service selection in a multi-service communications system in accordance with the present invention.

FIG. 5 is a functional diagram of an apparatus 82 for providing dynamic virtual service selection in a multi-service communications system in accordance with the present invention. Apparatus 82 may be employed as the decoder 76 at each subscriber location in the exemplary system 10 of FIG. 4. According to the present invention, the apparatus 82 comprises a service selection switch 90 for selecting either one of the basic services directly or one of a plurality of dynamic virtual services. A dynamic virtual service comprises an associated group of basic services wherein only one of the basic services in the group is active during a given time period. Each basic service and each dynamic virtual service is given a unique service number. In the example shown in FIG. 5, there are thirty-two basic services (e.g., basic service nos. 1–32) and three dynamic virtual services (e.g., dynamic virtual service nos. 50–52). In other embodiments, the number of basic services and dynamic virtual services may be different. Assignment of service numbers to each basic service and virtual dynamic service is completely arbitrary and is usually performed by the operator of the communications system. For example, in a subscription television system, service number "14" may be assigned to a particular pay-television service, and service number "6" may be assigned to a network broadcast. Subscribers are typically provided with a "program guide" that lists each available service by number. The service selection switch 90 may comprise a push-button device wherein each button corresponds to a different service number. Alternatively, the service selection switch 90 may comprise a hand-held remote-control wherein the selected service number appears on an LED display on the apparatus 82. Still further, the service selection switch 90 may comprise a graphical user interface displayed on a computer or television screen at the subscriber location.

Apparatus 82 further comprises a tuning map 92, a service-to-component map 94 and a dynamic virtual service map 96. For convenience of illustration only, the service selection numbers are illustrated twice in FIG. 5, once to illustrate the tuning map 92 functionality and once to illustrate the dynamic virtual service map 96 and service-to-component map 94 functionality. As illustrated in FIG. 5, the tuning map 92 identifies, for each basic service, which of the frequency channels carries the multiplexed service components of that basic service. For purposes described hereinafter, the tuning map 92 also specifies, for each dynamic virtual service, the frequency channel that carries the service components of a "home" basic service for that dynamic virtual service. Once the appropriate frequency channel is identified, the service-to-component map 94 specifies which multiplexed service components within that frequency channel "make-up" the selected basic service.

At any given time, the dynamic virtual service map 96 specifies the currently active basic service of a selected virtual dynamic service. As mentioned above, a dynamic virtual service is an associated group of basic services, only one of which is active for that dynamic virtual service during a given time period. For example, in FIG. 5, dynamic virtual service no. "50" comprises basic service nos. "1", "3", "24" and "30". During time period $T_1$, basic service no. "1" is active, during time period $T_2$, basic service no. "30" is active, and so on. The time periods $T_1..T_N$ may be different for each dynamic virtual service, and each dynamic virtual service may comprise any number of basic services. As described hereinafter in greater detail, the apparatus 82 further comprises means responsive to the service selection switch 90 and to the dynamic virtual service map 96 for automatically selecting the currently active basic service of a selected dynamic virtual service. When a subscriber chooses a dynamic virtual service via the service selection switch 90, the apparatus 82 accesses the dynamic virtual service map 96 to determine which basic service is currently active for that dynamic virtual service. Once identified, the currently active basic service is automatically selected as described hereinafter in greater detail. As can be appreciated, the dynamic virtual service facility of the present invention provides system operators with the ability to define new services (i.e., dynamic virtual services) using time-varying groups of basic services.

Figure 6:
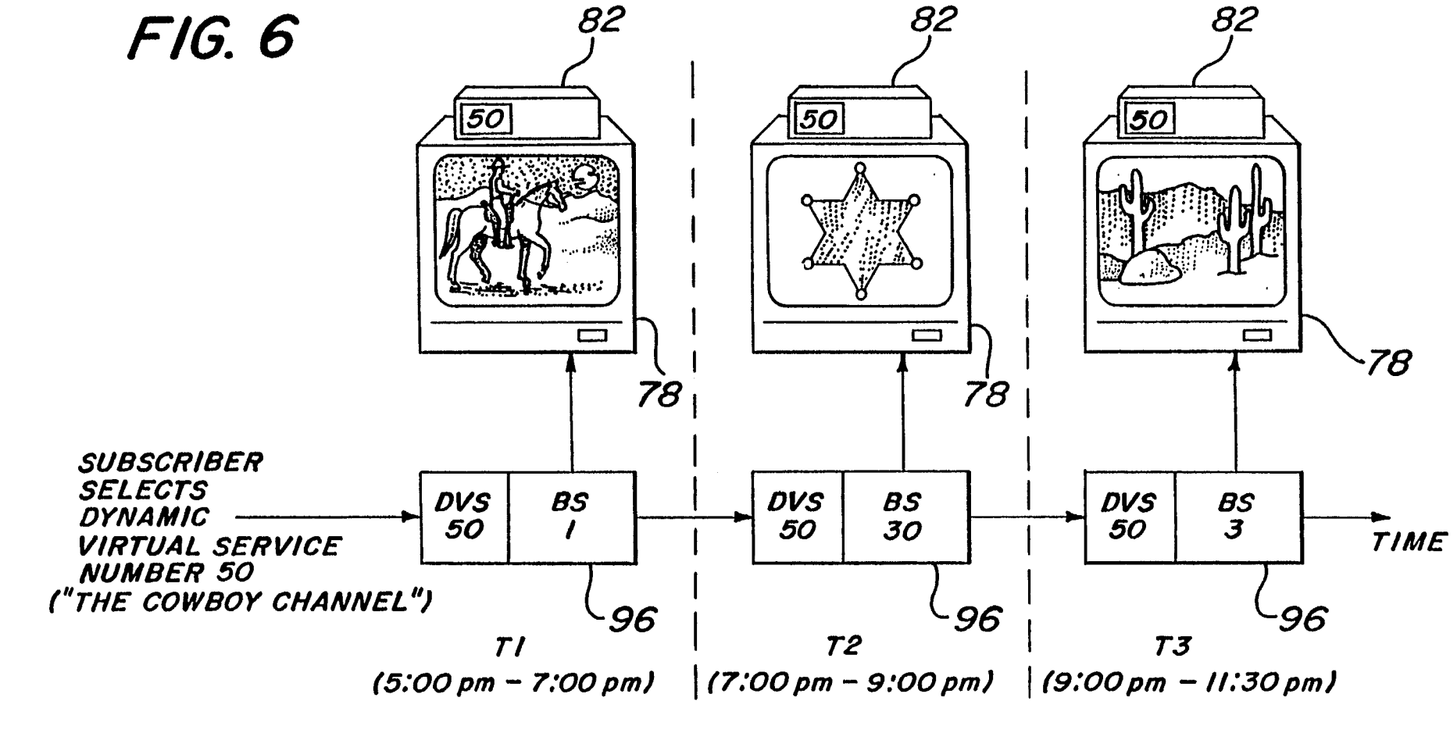
FIG. 6 graphically illustrates the dynamic virtual service concept of the present invention.

FIG. 6 graphically illustrates the dynamic virtual service concept of the present invention. More particularly, FIG. 6 illustrates an example wherein a system operator has defined a dynamic virtual service called the "Cowboy Channel" which is assigned dynamic virtual service number "50." By way of example, suppose that during time period T1 (i.e., between 5:00 pm and 7:00 pm), a subscriber chooses to view the "Cowboy Channel" by selecting service number "50" via the service selection switch 90. During that time period, the dynamic virtual service map 96 specifies basic service no. "1" as the currently active basic service for dynamic virtual service "50". Basic service no. "1" may be a documentary about famous cowboys that is scheduled to end at 7:00 pm. Unknown to the subscriber, the dynamic virtual service map definition for service no. "50" changes at 7:00 pm and basic service no. "30" becomes the active basic service for that dynamic virtual service. During period $T_2$, basic service "30" may be a network broadcast of a classic western movie that ends at 9:00 pm. A similar redefinition will then occur at 9:00 pm. As mentioned, means are provided in the apparatus 82 for automatically selecting the currently active basic service of the subscriber selected dynamic virtual service. As can be appreciated, therefore, the dynamic virtual service facility of the present invention provides system operators with a highly flexible means for defining new services from an associated group of basic services on a time varying basis.

Figure 7:
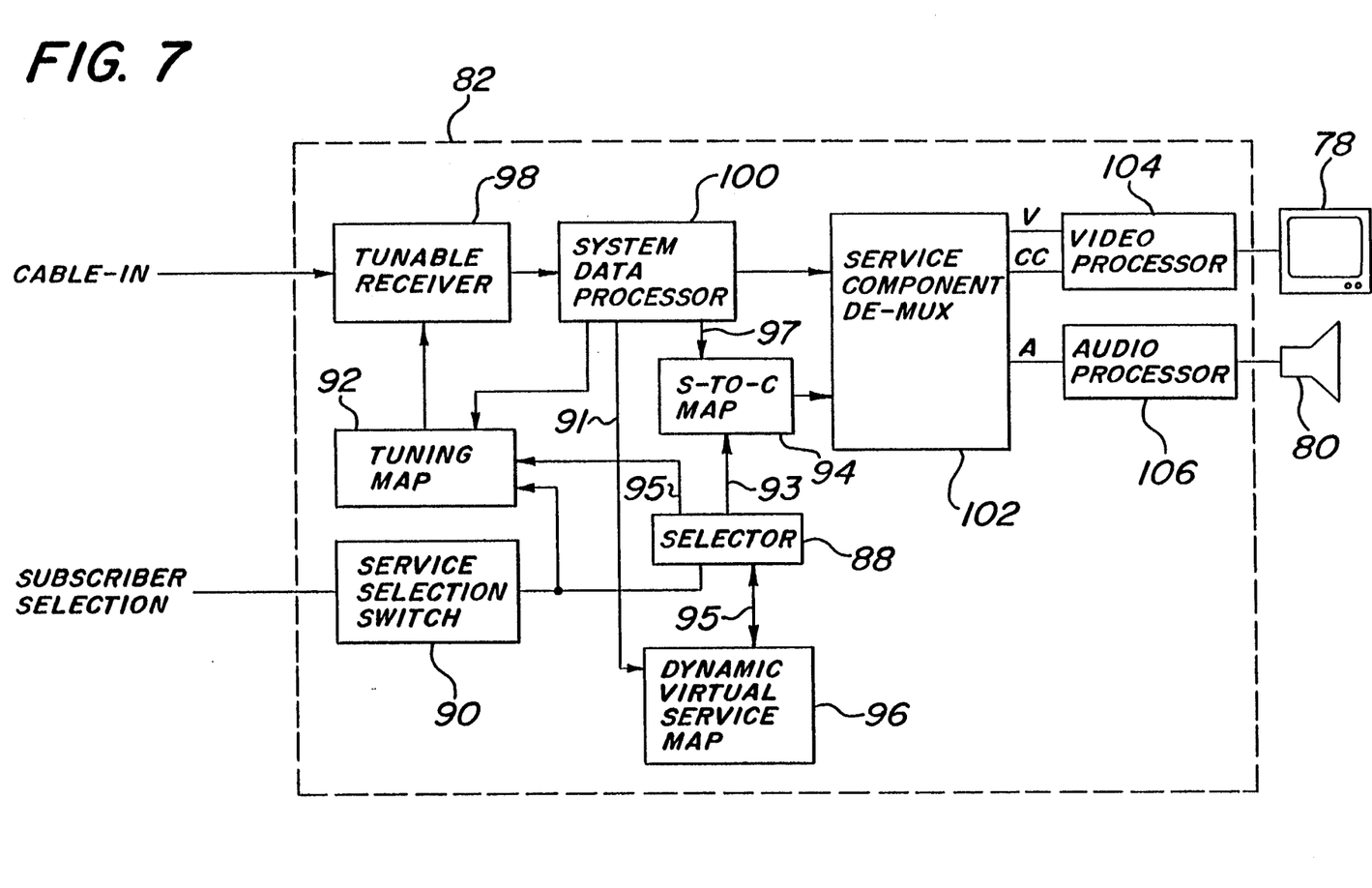
FIG. 7 is a block diagram showing further details of a preferred embodiment of the apparatus of FIG. 5.

FIG. 7 is a block diagram illustrating further details of a preferred embodiment of the apparatus 82 of the present invention. In addition to the service selection switch 90, the tuning map 92, the service-to-component map 94, and the dynamic virtual service map 96, the apparatus 82 further comprises a tunable receiver 98 responsive to the tuning map 92 for tuning to the frequency channel carrying the multiplexed service components for a selected basic service. As described above, each frequency channel may also carry system related data. Once received, the system data and multiplexed service components are passed through a system data processor 100 which extracts the system data from the incoming data stream for processing. When the system data and multiplexed service components are transmitted in the frame format illustrated in FIGS. 2 and 3, the processor 100 may employ the HSYNC and VSYNC words to establish frame synchronization to facilitate extraction of the system data from each frame. Processor 100 then passes the multiplexed service component data to a service component de-multiplexer 102 which is responsive to the service-to-component map 94 for de-multiplexing the received multiplexed service components and obtaining the service components of the selected basic service. Video related service components of the selected service (e.g., video, closed-captioning, teletext, etc.) may be output to a video processor 104 and then displayed on a television set 78. Audio service components of the selected basic service may be output to an audio processor 106 and then provided to an audio output device, such as a speaker system 80. As defined in the claims, the tuning map 92, service-to-component map 94, tunable receiver 98 and service component de-multiplexer 102 collectively provide a means for receiving and accessing the service components of a selected basic service from the frequency channel carrying those components.

In operation, a subscriber selects either one of the basic services or one of the dynamic virtual services via the service selection switch 90. Switch 90 provides the service number of the selected service to the tuning map 92 which prompts the tunable receiver 98 to immediately tune to the frequency channel specified in the tuning map for that service number. As mentioned above, for basic services, the tuning map 92 identifies the frequency channel carrying the multiplexed service components of that basic service. For virtual dynamic services, the tuning map 92 specifies the frequency channel carrying the service components of a "home" basic service for that virtual dynamic service. When a subscriber initially selects a dynamic virtual service, the switch 90 provides the service number of that dynamic virtual service to the tuning map 92 which then prompts the receiver 98 to "tune" to the frequency channel carrying the "home" basic service for that selected dynamic virtual service.

Switch 90 also provides the service number of the selected service (i.e., basic service or virtual dynamic service) to a selector 88 and to the dynamic virtual service map 96. If the subscriber has selected a basic service, then the selector 88 simply provides the service number of that selected basic service to the service-to-component map 94 via line 93. If, however, the subscriber has selected a dynamic virtual service, then the selector 88 accesses the dynamic virtual service map 96 to determine the service number of the currently active basic service for that selected dynamic virtual service. Selector 88 then provides that service number on line 93 to the service-to-component map 94. Unless the subscriber selects a different service, selector 88 will continuously examine the dynamic virtual service map 96 for changes in the "active" basic service definition for the selected dynamic virtual service. Whenever the active service definition changes, selector 88 will provide the new basic service number on line 93. Selector 88 therefore provides a means for automatically selecting the currently active basic service of a subscriber selected dynamic virtual service. As can be appreciated, the service number output on line 93 will either be the service number of a basic service selected by the subscriber directly, or the number of the currently active basic service for a subscriber selected dynamic virtual service.

As explained above, when a subscriber initially selects a dynamic virtual service, the receiver 98 first tunes to the frequency channel carrying the "home" basic service for that dynamic virtual service. However, selector 88 may immediately determine from the dynamic virtual service map 96 that the "home" basic service is not the currently active basic service for the selected dynamic virtual service. When the currently active basic service is not the "home" basic service, selector 88 must provide the service number of the currently active basic service to the tuning map via line 95 so that the receiver 98 can automatically re-tune from the frequency channel carrying the "home" basic service to the frequency channel carrying the currently active basic service. Thereafter, whenever the currently active basic service definition for the selected dynamic virtual service changes, selector 88 must again provide the newly active basic service number to the tuning map 92 via line 95 so that the receiver 98 can automatically re-tune to the proper frequency channel.

Once the receiver 98 tunes to the frequency channel carrying a selected basic service (i.e., a basic service selected by the subscriber directly, or the currently active basic service for a subscriber selected dynamic virtual service), the receiver 98 begins receiving the multiplexed service components, as well as any system data, carried on that frequency channel. As mentioned above, the received data first passes through the system data processor 100 which processes any system data transmitted on the frequency channel and then passes the multiplexed service component data to the service component de-multiplexer 102.

De-multiplexer 102 receives the service-to-component map definition for the selected basic service from the service-to-component map 94 and employs that information to extract the service components of the selected basic service. An exemplary implementation of a service-component demultiplexer may be found in the aforementioned co-pending U.S. application Ser. No. 07/968,846. Again, however, the particular implementation of the de-multiplexer is not crucial to the present invention and will depend in large part upon the particular data stream format employed in the communications system. Once the service components for the selected service have been obtained, video related services may be provided to a video processor 104, and audio related services may be provided to an audio processor 106. As explained above, the present invention is by no means limited to audio and video related service components. For example, a service component may be comprised of computer related data that may then be output on a computer system (not shown) at the subscriber location. As stated above, the present invention may be employed in any multi-service communications system.

Figure 8:
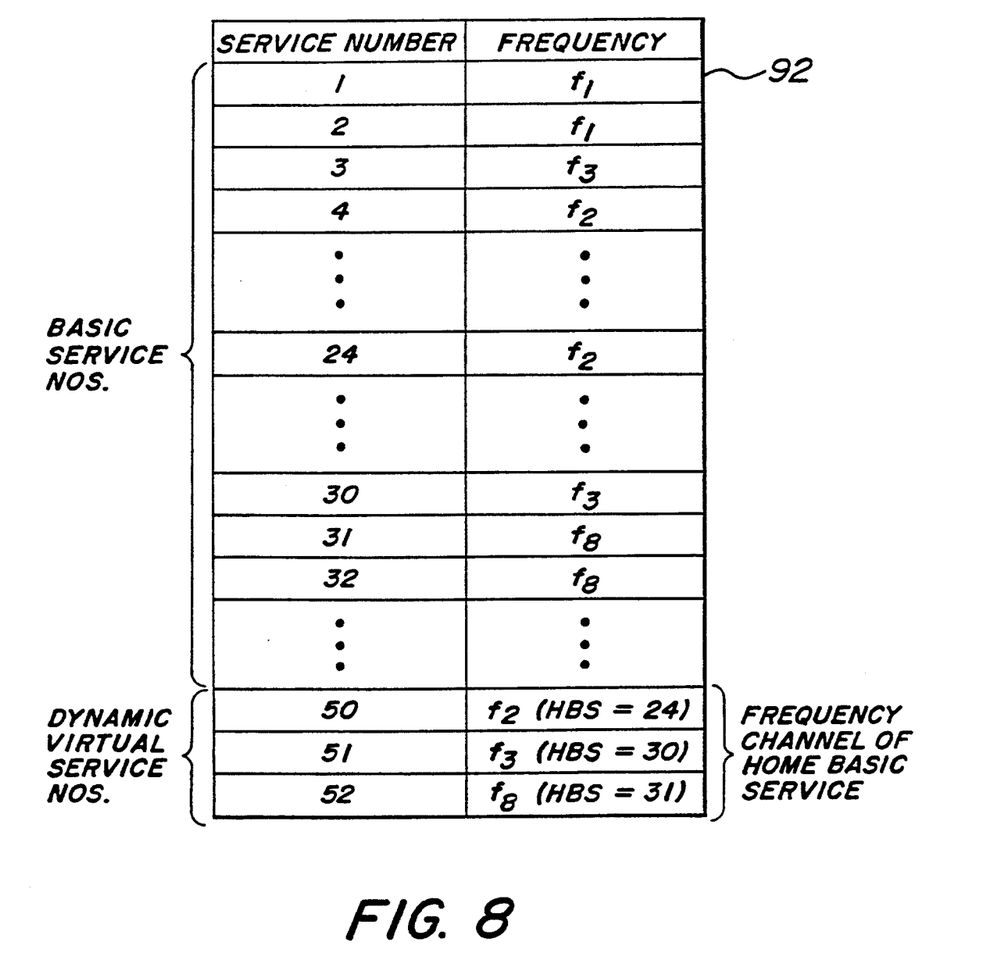
FIG. 8 illustrates the general arrangement and contents of an exemplary tuning map in accordance with the present invention.

FIG. 8 illustrates the general arrangement and contents of the tuning map 92. According to the present embodiment, the entire tuning map 92 is stored in the apparatus 82. However, the tuning map 92 may be modified by transmitting a modified tuning map to the apparatus 82. Tuning map information may be transmitted as system data on one or more of the frequency channels when required. As shown in FIG. 8, the tuning map 92 contains an entry for each basic service and dynamic virtual service available to a subscriber. For basic services, each entry in the tuning map 92 specifies the frequency channel (e.g., $f_1$, $f_2$, etc.) that carries the multiplexed service components for that basic service. For dynamic virtual services, the tuning map 92 specifies the frequency channel of the "home" basic service for that dynamic virtual service. For example, as illustrated in FIG. 5, dynamic virtual service "50" comprises basic services "1", "3", "24" and "30". Basic service number "24" is defined as the "home" basic service for dynamic virtual service "50". Consequently, as shown in FIG. 8, the tuning map entry for service number "50" specifies the frequency channel ($f_2$) of basic service "24". The need for a home basic service for each dynamic virtual service is explained hereinafter.

Figure 9:
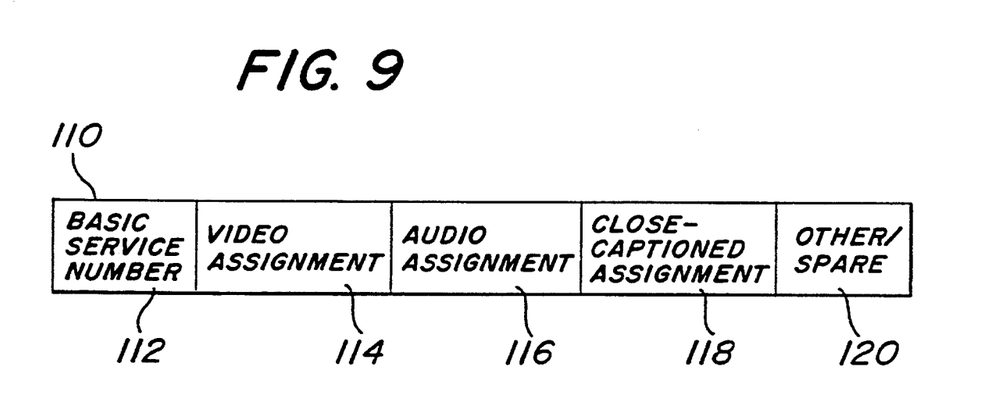
FIG. 9 illustrates the general arrangement and contents of an exemplary service-to-component map definition in accordance with the present invention.

FIG. 9 illustrates the general arrangement and contents of an exemplary service-to-component map definition 110 for a given basic service. As shown, the definition 110 comprises a service number designation 112 that specifies the service number of that basic service. The service number 112 is followed by one or more service component assignments 114..120. Each of the service component assignments 114..120 identifies a different one of the service components that collectively comprise that basic service. As described above, the service component demultiplexer 102 employs the service-to-component definition of a selected basic service to extract the service components for that basic service from the many service components provided in multiplexed form on the received frequency channel. According to the present embodiment, the apparatus 82 does not permanently store the service-to-component map definitions for every basic service. Rather, the service-to-component map definition for each basic service is periodically (and frequently) re-transmitted to the apparatus 82 as system data on the frequency channel carrying the service components of that basic service. For example, if the communications system employs the exemplary frame format of FIGS. 2 and 3, the service-to-component map definition of a particular basic service may be re-transmitted once every cryptocycle.

When a particular basic service is selected, the selection switch 90 provides the selected service number to the tuning map 92 which, in turn, provides the appropriate channel frequency to the receiver 98. Because the service definition for the selected service is transmitted on that same channel frequency, the system data processor 100 is able to obtain the service-to-component map definition for the selected basic service and provide that definition to the service-to-component map 94 via line 97. However, the service-to-component map 94 will not permanently store the definition since it can reacquire the definition when needed.

Figure 10:
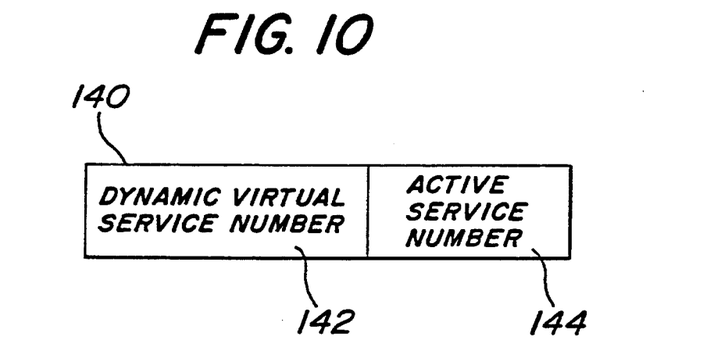
FIG. 10 illustrates the general arrangement and contents of an exemplary dynamic virtual service map definition in accordance with the present invention.

Like the service-to-component map 94, the dynamic virtual service map 96 provides a dynamic virtual service definition for each selected dynamic virtual service. FIG. 10 illustrates an exemplary dynamic virtual service map definition 140. As shown, the dynamic virtual service map definition 140 comprises a dynamic virtual service number designation 142 which is assigned by the system operator. An active service designation 144 specifies the service number of the currently active basic service for that dynamic virtual service. Because the active basic service for a given dynamic virtual service may change at any time, the dynamic virtual service definitions for each dynamic virtual service must frequently be re-transmitted to the apparatus 88 as system data. For example, if the communications system employs the frame format of FIGS. 2 and 3, the dynamic virtual service definition of a particular dynamic virtual service may be re-transmitted once every cryptocycle. As with the service-to-component map definitions, the system data processor 100 will receive dynamic virtual service map definitions transmitted over a given frequency channel and provide those definitions to the dynamic virtual service map 96, via line 91. According to the preferred embodiment, however, transmission bandwidth is conserved by not transmitting every dynamic virtual service definition on every frequency channel. Rather, the definition for a particular dynamic virtual service is only trammined on those frequency channels that carry the multiplexed service components of one of the group of basic services associated with that dynamic virtual service. For example, referring to FIG. 5, the definition for dynamic virtual service no. "51" will only be carried as system data on the frequency channels that carry the multiplexed service components for basic services "4", "30", and "32", i.e., the group of basic service that "make-up" dynamic virtual service "51". Consequently, once a subscriber "enters" a particular dynamic virtual service, the definition for that dynamic virtual service will always be received by the apparatus 82.

Because the dynamic virtual service map definition for a particular dynamic virtual service is only transmitted on the frequency channels of the basic services that "make-up" that dynamic virtual service, one of those basic services must be defined as a "home" basic service. The need for a "home" basic service is best illustrated by way of example. Suppose a subscriber selects a particular dynamic virtual service, having previously selected a basic service that is not one of the basic services of the presently selected dynamic virtual service. Because the previously selected basic service was not one of the group of basic services of the selected dynamic virtual service, the apparatus 82 has not received a dynamic virtual service definition for the selected dynamic virtual service, and therefore, cannot determine the currently active basic service. To avoid this problem, one of the basic services in the group that "make-up" each dynamic virtual service is designated as the "home" basic service for that dynamic virtual service. As explained above, a tuning map entry is provided for each dynamic virtual service that specifies the frequency channel of the home basic service. When a subscriber initially selects a particular dynamic virtual service, the receiver 98 will immediately tune to the frequency channel of the home basic service. The system data processor 100 will therefore begin receiving the dynamic virtual service definition of the selected dynamic virtual service. Of course, if the currently active basic service specified in the received definition is different than the "home" basic service, then the selector 88 will provide the service number of the currently active basic service on line 95 in order to force the receiver 98 to re-tune from the home basic service to the currently active basic service. Preferably, the basic service most likely to be the currently active basic service is defined as the home service.

From the foregoing description, it can be seen that the present invention is directed to an apparatus that provides dynamic virtual service selection in a multiservice communications system. Although the present invention has been described in the context of a subscription television system, the present invention is by no means limited thereto. Rather, the present invention may be employed in any multi-service communications system. For example, the apparatus of the present invention may be employed at the site of a direct-broadcast-satellite subscriber, in which case, the tuning map 92 would specify a different satellite transponder frequency for each service number rather than one of the 6 Mhz frequency channels of the cable distribution network 70 described above. Furthermore, it is understood that changes may be made to the embodiment described above without departing from the broad inventive concepts thereof. Accordingly, this invention is not limited to the particular embodiments disclosed, but is intended to cover all modifications that are within the scope and spirit of the invention as defined by the appended claims. For example, if sufficient memory is available, the service-to-component map definitions and dynamic virtual service definitions for every service may be more permanently stored in the apparatus 82 (e.g., at blocks 94 and 96 of FIG. 7), thereby obviating the need to frequently retransmit the definitions. Changes to the various service definitions, however, could still be performed by transmitting modifications to the apparatus 82. Additionally, storage of the dynamic virtual service definitions may also obviate the need to designated a home basic service for each dynamic virtual service, since the most recently active basic service would be maintained in the memory.

What is claimed is:

1. An apparatus for enabling a subscriber to access different basic services, wherein each of the different basic services comprises a plurality of service components, said service components of each basic service being received in a multiplexed form on one of a plurality of frequency channels, some frequency channels containing multiplexed service components for more than one basic service, said apparatus comprising:

a service selection switch for selecting either one of said basic services directly or one of a plurality of dynamic virtual services, each dynamic virtual service comprising an associated group of said basic services wherein only one of said group is active during a given time period;

a dynamic virtual service map that defines, on a time-varying basis, for each dynamic virtual service, a currently active one of said group of basic services that comprise that dynamic virtual service;

means responsive to the service selection switch and to the dynamic virtual service map for automatically selecting the currently active basic service of a selected dynamic virtual service; and means for receiving and accessing the service components of a selected basic service from the frequency channel carrying those components.

2. Apparatus recited in claim 1 wherein the dynamic virtual service map contains a dynamic virtual service definition for each dynamic virtual service and wherein the definition for each dynamic virtual service is periodically re-transmitted to the apparatus on each frequency channel carrying service components of one of the group of basic services that comprise that dynamic virtual service, said apparatus further comprising means for receiving and processing said transmitted dynamic virtual service definitions.

3. Apparatus recited in claim 2 wherein each dynamic virtual service definition comprises a dynamic virtual service number designation and an active basic service designation that specifies the currently active basic service for the designated dynamic virtual service.

4. Apparatus recited in claim 2 wherein a home basic service is defined for each dynamic virtual service and further wherein said apparatus initially accesses the home basic service when a dynamic virtual service is selected by a subscriber.

5. Apparatus recited in claim 4 wherein the home basic service for a particular dynamic virtual service is selected from one of the group of basic services that comprise that dynamic virtual service.

6. Apparatus recited in claim 5 wherein the basic service selected as the home basic service is the basic service from said group that, on average, is most often the currently active basic service for that dynamic virtual service.

7. Apparatus recited in claim 1 wherein the service components comprise digital data.

8. Apparatus recited in claim 1 wherein the means for receiving and accessing the service components of a selected basic service comprises:
 a tuning map that identifies, for each basic service, which of said frequency channels carries the multiplexed service components that comprise that basic service;
 a tunable receiver responsive to the tuning map for tuning to the frequency channel carrying the multiplexed service components for a selected basic service and for receiving the multiplexed service components carried on that frequency channel;
 a service-to-component map that defines, for the selected basic service, which multiplexed service components in the received frequency channel comprise that basic service; and
 a service component de-multiplexer coupled to the receiver and responsive to the service-to-component map for de-multiplexing the received multiplexed service components and for obtaining those service components that comprise the selected basic service.

9. Apparatus recited in claim 8 wherein the tuning map is reprogrammable, and wherein the tuning-map is reprogrammed by transmitting a modified tuning map on one or more of said frequency channels.

10. Apparatus recited in claim 8 wherein a home basic service is defined for each dynamic virtual service and wherein the tuning map further contains an entry for each dynamic virtual service that specifies the frequency channel carrying the multiplexed service components of the home basic service of that dynamic virtual service, whereby upon selecting a dynamic virtual service, the tunable receiver initially tunes to the frequency channel carrying the service components of the home basic service of that selected dynamic virtual service.

11. Apparatus recited in claim 8 wherein the service-to-component map definition for each service is periodically re-transmitted to the apparatus on the frequency channel carrying the service components of that basic service, said apparatus further comprising means for receiving and processing the transmitted service-to-component map definitions.

12. Apparatus recited in claim 11 wherein each service-to-component map definition comprises a service number designation and at least one service component assignment.

13. An apparatus for enabling a subscriber to access different basic services, wherein each of the different basic services comprises a plurality of service components, said service components of each basic service being received in a multiplexed form on one of a plurality of frequency channels, some frequency channels containing multiplexed service components for more than one basic service, said apparatus comprising:
 a service selection switch for selecting either one of said basic services directly or one of a plurality of dynamic virtual services, each dynamic virtual service comprising an associated group of said basic services wherein only one of said group is active during a given time period;
 a dynamic virtual service map that defines, on a time-varying basis, for each dynamic virtual service, a currently active one of said group of basic services that comprise that dynamic virtual service;
 means responsive to the service selection switch and to the dynamic virtual service map for automatically selecting the currently active basic service of a selected dynamic virtual service;
 a tuning map that identifies, for each basic service, which of said frequency channels carries the multiplexed service components that comprise that basic service;
 a tunable receiver responsive to the tuning map for tuning to the frequency channel carrying the multiplexed service components for a selected service and for receiving the multiplexed service components carried on that frequency channel;
 a service-to-component map that defines, for the selected basic service, which multiplexed service components in the received frequency channel comprise that basic service; and
 a service component de-multiplexer coupled to the receiver and responsive to the service-to-component map for de-multiplexing the received multiplexed service components and for obtaining those components that comprise the selected service.

14. Apparatus recited in claim 13 wherein the dynamic virtual service map contains a dynamic virtual service definition for each dynamic virtual service and wherein the definition for each dynamic virtual service is periodically re-transmitted to the apparatus on each frequency channel carrying service components of one of the group of basic services that comprise that dynamic virtual service, said apparatus further comprising means for receiving and processing said transmitted dynamic virtual service definitions.

15. Apparatus recited in claim 14 wherein each dynamic virtual service definition comprises a dynamic virtual service number designation and an active basic service designation that specifies the currently active basic service for the designated dynamic virtual service.

16. Apparatus recited in claim 13 wherein a home basic service is defined for each dynamic virtual service and wherein the tuning map further contains an entry for each dynamic virtual service that specifies the frequency channel carrying the multiplexed service components of the home basic service of that dynamic virtual service, and whereby upon selecting a dynamic virtual service, the tunable receiver initially tunes to the frequency channel carrying the service components of the home virtual service of that selected dynamic virtual service.

17. Apparatus recited in claim 13 wherein the service components comprise digital data.

18. Apparatus recited in claim 13 wherein the tuning map may be reprogrammed by transmitting a modified tuning map on one or more of said frequency channels.

19. Apparatus recited in claim 13 wherein the service-to-component map definition for each service is periodically re-transmitted to the apparatus on the frequency channel carrying the service components of that basic service, said apparatus further comprising means for receiving and processing the transmitted service-to-component map definitions.

20. An apparatus for enabling a subscriber to access different basic services, wherein each of the different basic services comprises a plurality of service components, said service components of each basic service being received in a multiplexed form on one of a plurality of frequency channels, at least some frequency channels containing multiplexed service components for more than one basic service, said apparatus comprising:
  a service selection switch for selecting either one of said basic services directly or one of a plurality of dynamic virtual services, each dynamic virtual service comprising an associated group of said basic services wherein only one of said group is active during a given time period;
  first means for receiving a dynamic virtual service map definition for a selected dynamic virtual service, said received definition specifying, for the selected dynamic virtual service, a currently active one of the group of basic services that comprise that dynamic virtual service;
  second means responsive to a received dynamic virtual service map definition for automatically selecting the currently active basic service specified by the received definition; and
  third means responsive to the selection switch and to the second means for receiving and accessing the service components of a selected basic service from the frequency channel carrying those components.

21. Apparatus recited in claim 20 wherein the dynamic virtual service map definition for a selected dynamic virtual service is periodically re-transmitted to the apparatus on each frequency channel carrying service components of one of the group of basic services that comprise that dynamic virtual service.

22. Apparatus recited in claim 21 wherein the dynamic virtual service map definition for a selected dynamic virtual service comprises a dynamic virtual service number designation and an active basic service designation that specifies the currently active basic service for that dynamic virtual service.

23. Apparatus recited in claim 20 wherein a home basic service is defined for each dynamic virtual service and further wherein said apparatus is operative to initially access the home basic service upon selection of a dynamic virtual service by a subscriber.

24. Apparatus recited in claim 23 wherein the home basic service defined for a particular dynamic virtual service is one of the group of basic services that comprise that dynamic virtual service.

25. Apparatus recited in claim 20 wherein the means for receiving and accessing the service components of a selected basic service comprises:
  a tuning map that identifies, for each basic service, which of said frequency channels carries the multiplexed service components that comprise that basic service;
  a tunable receiver responsive to the tuning map for tuning to the frequency channel carrying the multiplexed service components of the selected basic service and for receiving the multiplexed service components carried on that frequency channel;
  means for receiving a service-to-component map definition for the selected basic service that specifies for that basic service which multiplexed service components in the received frequency channel comprise that basic service; and
  a service component de-multiplexer coupled to the receiver and responsive to the received service-to-component map definition for de-multiplexing the received multiplexed service components and for obtaining the service components specified by the received definition.

26. Apparatus recited in claim 25 wherein the tuning map contains an entry for each basic service, and further wherein the tuning map is re-programmable and may be reprogrammed by transmitting a modified tuning map on one or more of said frequency channels.

27. Apparatus recited in claim 26 wherein a home basic service is defined for each dynamic virtual service and wherein the tuning map further contains an entry for each dynamic virtual service that specifies the frequency channel carrying the multiplexed service components of the home basic service of that dynamic virtual service, said tunable receiver, upon selection of a dynamic virtual service by the subscriber, being operative to initially tune to the frequency channel carrying the service components of the home basic service of the subscriber selected dynamic virtual service.

28. Apparatus recited in claim 25 wherein the service-to-component map definition for each basic service is periodically re-transmitted to the apparatus on the frequency channel carrying the service components of that basic service.

29. In a multi-service communications system wherein a plurality of different basic services are transmitted to a subscriber location, each basic service being transmitted to the subscriber location on one of a plurality of different frequency channels, some frequency channels carrying more than one basic service, a method for providing dynamic virtual service selection at the subscriber location comprising the steps of:
  (a) defining a dynamic virtual service as a group of basic services wherein each basic service of said group is to be broadcast over one of said frequency channels during a different time period than the other basic services; and
  (b) periodically transmitting to the subscriber location a dynamic virtual service map definition for the defined dynamic virtual service that specifies which of the basic services of said group is currently being broadcast to the subscriber location, whereby upon selection of the defined dynamic virtual service by a subscriber, a decoder at the subscriber location may employ the transmitted dynamic virtual service map definition for the selected dynamic virtual service to determine the currently active basic service for that dynamic virtual service.

30. A method according to claim 29 further comprising the step of assigning a unique service number to the dynamic virtual service defined in step (a).

31. A method according to claim 30 wherein a dynamic virtual service map definition transmitted in step (c) for the defined dynamic virtual service contains a dynamic virtual service number designation that specifies the unique service number assigned to that dynamic virtual service, and an active basic service designation that specifies the currently active basic service for that dynamic virtual service.

32. A method according to claim 29 wherein the dynamic virtual service map definitions for the defined dynamic virtual service are periodically transmitted to the subscriber location on each frequency channel that carries one of the basic services of the group that comprise that dynamic virtual service.

33. A method according to claim 29 further comprising the step of designating one of the basic services from the group of basic services that comprise the defined dynamic virtual service as a home basic service, and wherein upon selection of the dynamic virtual service by a subscriber, a decoder at the subscriber location may initially tune to the frequency channel carrying the home basic service in order to receive one of the dynamic virtual service map definitions transmitted on that frequency channel.

34. A method for providing dynamic virtual service selection in a multi-service communications system wherein a plurality of different basic services are transmitted from a transmission site to a subscriber location, each of the different basic services comprising a plurality of service components, the service components of each basic service being transmitted to the subscriber location in multiplexed form on one of a plurality of different frequency channels, some frequency channels carrying multiplexed service components for more than one basic service, said method comprising the steps of:

(a) defining a plurality of dynamic virtual services, each dynamic virtual service comprising an associated group of basic services, only one of which is active at any given time;

(b) for each dynamic virtual service defined in step (a), periodically generating at the transmission site a dynamic virtual service map definition that specifies the currently active basic service of the group comprising that dynamic virtual service; and (c) periodically transmitting the dynamic virtual service map definitions for each dynamic virtual service to the subscriber location, whereby upon selection of one of the dynamic virtual services by a subscriber, a decoder at the subscriber location may employ the transmitted dynamic virtual service map definition for the selected dynamic virtual service to determine the currently active basic service for that dynamic virtual service.

35. A method according to claim 34 further comprising the step of assigning a unique service number to each of the dynamic virtual services defined in step (a).

36. A method according to claim 35 wherein the dynamic virtual service map definitions generated in step (b) for a given dynamic virtual service each contain a dynamic virtual service number designation that specifies the unique service number assigned to that dynamic virtual service, and an active basic service designation that specifies the currently active basic service for that dynamic virtual service.

37. A method according to claim 34 wherein, in said transmitting step, the dynamic virtual service map definitions for a given dynamic virtual service are periodically transmitted to the subscriber location on each frequency channel that carries the service components of one of the group of basic services that comprise that dynamic virtual service.

38. A method according to claim 34 wherein for each dynamic virtual service, one of the basic services from the group of basic services that comprise that dynamic virtual service is defined as a home basic service, and wherein upon selection of one of the dynamic virtual services by a subscriber, a decoder at the subscriber location may initially tune to the frequency channel carrying the service components of the home basic service for the selected dynamic virtual service in order to receive one of the dynamic virtual service map definitions transmitted on that frequency channel for the selected dynamic virtual service.

* * * * *